United States Patent [19]

Stephanides

[11] 4,158,872

[45] Jun. 19, 1979

[54] SURGE DIVERTER

[75] Inventor: Viktor Stephanides, Zürich, Switzerland

[73] Assignee: Sprecher & Schuh AG, Aarau, Switzerland

[21] Appl. No.: 855,151

[22] Filed: Nov. 23, 1977

[30] Foreign Application Priority Data

Nov. 24, 1976 [CH] Switzerland ........................ 14781/76

[51] Int. Cl.[2] .............................................. H02H 3/22

[52] U.S. Cl. ...................................... 361/128; 315/36; 361/130

[58] Field of Search ............... 361/128, 127, 126, 130, 361/117; 315/36, 35; 313/325, 231.1

[56] References Cited

U.S. PATENT DOCUMENTS 3,519,878 7/1970 McStrack et al. ................... 361/128

3,611,044 10/1971 Osterhout et al. .................... 361/128

3,859,568 1/1975 Sakshaug ............................. 361/128

3,859,569 1/1975 Kresge ................................ 361/128

4,004,193 1/1977 Reckard ........................... 361/127 X

*Primary Examiner*—Patrick R. Salce

*Attorney, Agent, or Firm*—Haseltine, Lake & Waters

[57] ABSTRACT

A surge diverter connected between a conductor and ground comprising several spark-quenching gaps, voltage-controlled shunting resistors connected in series with these gaps and voltage controlled control-resistors, each connected in parallel either to a gap alone or to a unit formed by a gap and a shunting resistor in series with the latter. The voltage-controlled control-resistors have current-voltage characteristics with substantially the same steepness, while the resistance value of these control-resistors at the rated voltage increases sequentially from the conductor to grand.

4 Claims, 3 Drawing Figures

SURGE DIVERTER

BACKGROUND OF THE INVENTION

This invention relates to a surge diverter with several spark-quenching gaps, comprising voltage-controlled discharge resistors connected in series with these gaps and voltage-controlled control-resistors each of which is connected in parallel either with a spark-quenching gap or with the serial unit formed by a spark-quenching gap and a discharge resistor mounted in series. The prior art, as shown for instance in CH-Pat. No. 312 772, provides surge diverters with voltage-controlled resistors mounted in parallel either with each spark-quenching gap, or with the serial unit formed by a spark-quenching gap and a voltage-controlled discharge resistor mounted in series, in order to obtain a uniform voltage distribution.

The voltage at the leads of a voltage-dependant resistor is given by the formula $$U=kI\alpha$$

where k and $\alpha$ are constants. Resistors with a greater $\alpha$ have a steeper current-voltage characteristic.

A drawback of the arrestor mentioned in Swiss Pat. No. 314 772 is that the control resistors must carry a comparatively high current at the rated voltage, in order to suppress the influence of the stray capacitance. These control resistances therefore are comparatively bulky and consequently expensive.

The German published patent application No. 1.192.733 also describes an arrestor of the above type, in which the voltage-dependent resistors have characteristics of different steepness and exhibit about the same resistance at the rated voltage. However, the manufacture of such resistors offers considerable difficulty.

SUMMARY OF THE INVENTION

It is an object of this invention to avoid the above mentioned drawbacks and to provide an arrestor of the type described above, in which the voltage-controlling elements can be manufactured simply and economically. Moreover the voltage-control provided should ameliorate the sparking and quenching characteristics of the diverter for all practically arising overvoltage conditions. According to the invention, this is achieved by providing voltage-dependent control resistors having substantially equally steep current-voltage characteristics and with resistance values at the rated voltage which are mutually different and increase from the conductor toward the ground terminal.

BRIEF DESCRIPTION OF THE DRAWING

The invention will now be illustrated by a description of embodiments and with reference to the drawing, in which.

DETAILED DESCRIPTION

Figure 1:
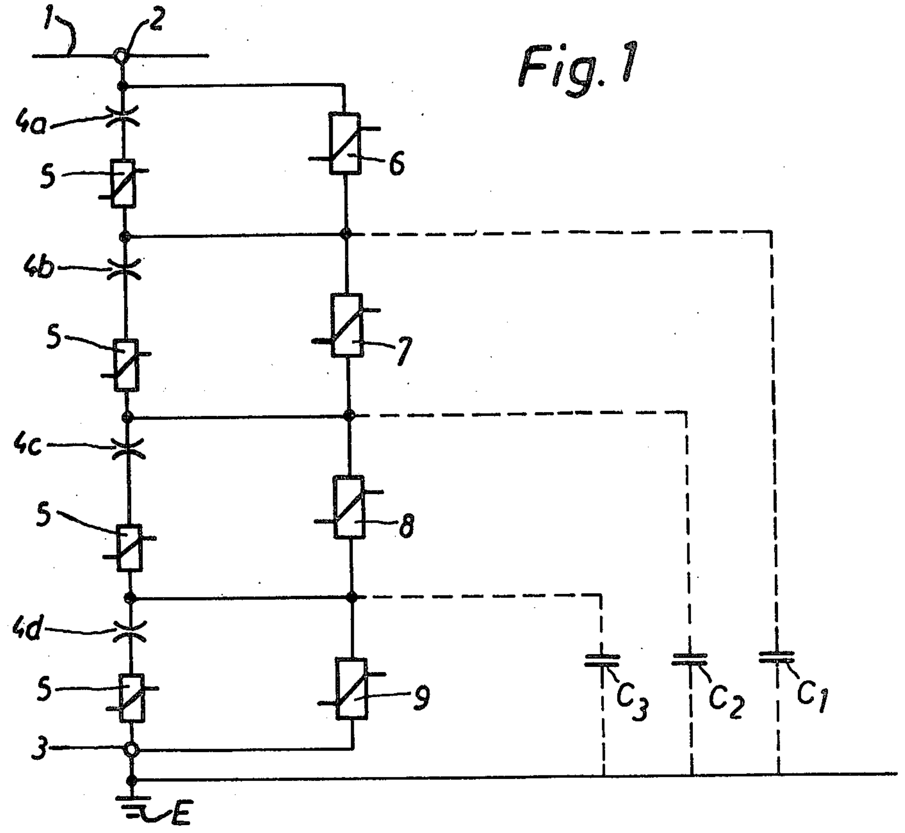
FIG. 1 is a circuit diagram of a diverter having voltage-dependent control-resistors according to the invention.

The figures schematically show a diverter connected between a conductor 1 which is at a certain potential, and the ground E. The terminals connecting the diverter to the conductor 1 and the ground E are designated by numberals 2 and 3, respectively. The diverter has several successive spark-quenching gaps **4*a*–4*d*. A voltage-controlled resistor 5 is connected in series with each spark-quenching gap 4. In order to provide a uniform voltage distribution, the voltage further comprises voltage-controlled control-resistors 6–9, which are connected in parallel either with each pair consisting of a spark-quenching gap 4 and a discharge resistor 5 mounted in series (FIGS. 1 and 3), or else in parallel with each spark-quenching gap 4 alone (FIG. 2). The current-voltage characteristics of these control-resistors 6–9 have essentially identical steepness, while having resistance values which are different and increase progressively from the conductor terminal 2 towards the ground terminal 3. Consequently, the control resistor 6 has the lowest resistance value, and control resistor 9** the highest.

It follows that in the above formula $U=kI\alpha$ the exponent $\alpha$ is about the same for all control resistors 6–9 ($\alpha_6=\alpha_7=\alpha_8=\alpha_9$) whereas the constant k has a different value for each of these resistors, with the condition $k_6<k_7<k_8<k_9$.

The control resistors 6–9 are so chosen, that at the rated frequency, e.g. 50 Hz, a uniform voltage distribution is obtained across the diverter. In the case of an overvoltage due to a lightning stroke, the voltage across the first control resistor 6 goes up and the top spark gap **4*a* is struck. In the case of switching overvoltages over a long time, the voltage increases across the lowest control resistor 9 and the lowest spark gap 4*d* is struck. A switching overvoltage over a short time will induce an increased voltage across the control resistor(s) 7 and/or 8, so that the spark gaps 4*b* and 4*c***, respectively, are struck.

The above-mentioned gradation of the resistance values of the control-resistors 6–9 accelerates the shunting or discharge process from the conductor 1 to the ground E in response to the arrival of a pulse edge, because when the voltage rises to discharge level, a comparatively low current traverses the lower control-resistors, which have the higher-resistance values.

Figure 2:
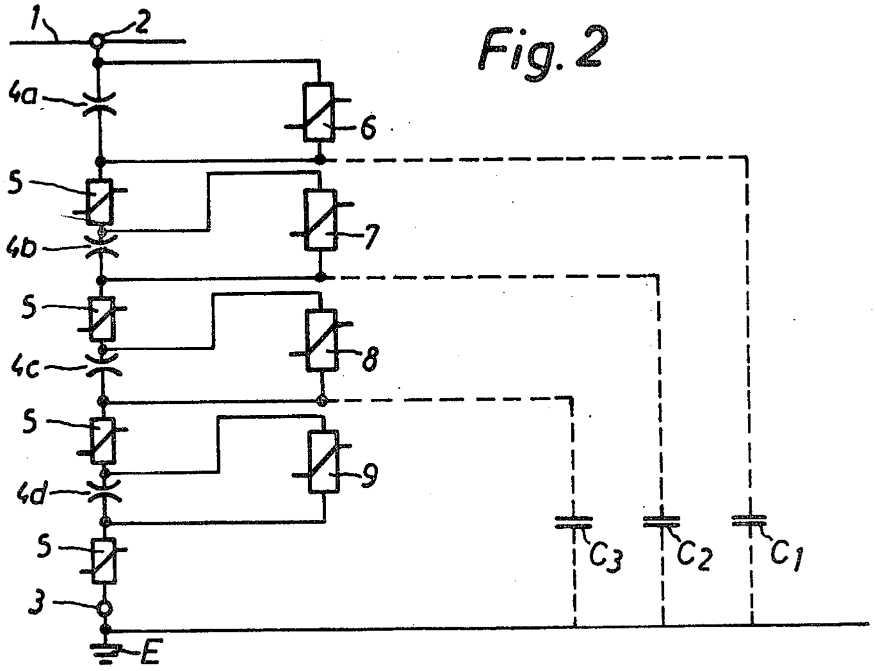
FIG. 2 is a circuit diagram of a second embodiment of a diverter with voltage-dependent control-resistors according to the invention.

The existing stray capacitances, designated by $C_1$, $C_2$, $C_3$ in FIGS. 1 and 2, are compensated by the control resistors 6–9. Expensive and complicated control-capacitors are therefore unnecessary.

The use of control resistors having the same values of $\alpha$ and different values of k allows for cheaper and easier manufacture of the diverter, because such resistors are easy to manufacture. The control resistors 6–9 can have comparatively high values and will therefore exhibit only a relatively low control current.

Figure 3:
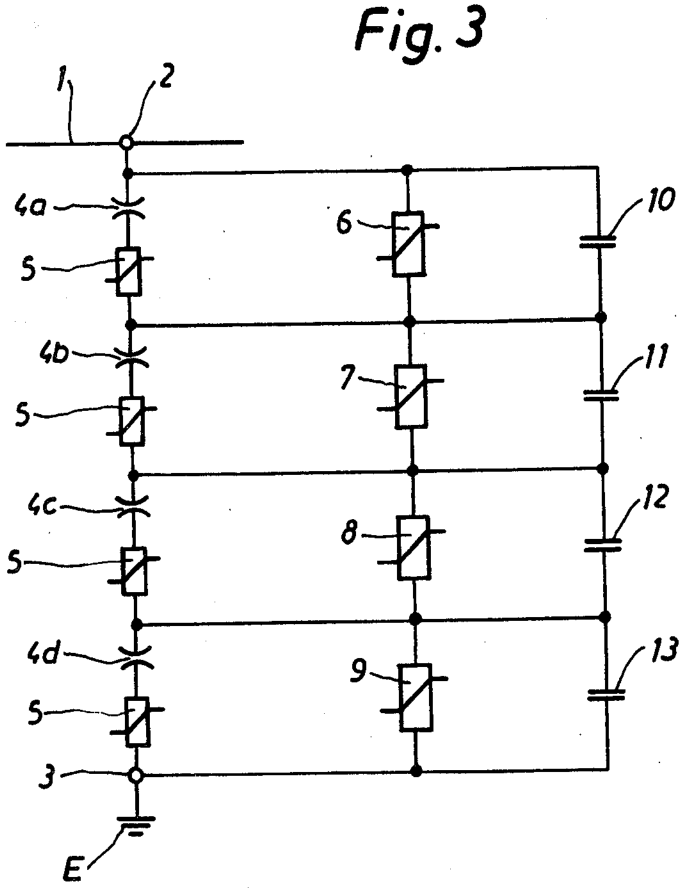
FIG. 3 shows the diverter of FIG. 1 with control condensers mounted in parallel with the control-resistors.

As shown in FIG. 3, in order to optimize both the voltage distribution and the costs, control capacitors 10–13 can be connected in parallel with the control resistors 6–9. Such capacitors may not only be provided - as shown in FIG. 3 for an embodiment such as that of FIG. 1, but also for a embodiment according to FIG. 2. Connecting the control capacitors 10–13 in parallel is especially advantageous in the case of very high voltages.

The capacitors 10–13 may have either the same or different graded capacitance values. In the latter case the values diminish when progressing from the conductor terminal 2 towards the ground terminal 3, that is the capacitor 13 has the smallest capacitance.

Comparatively low values may be chosen for these control capacitors 10–13, thereby reducing costs.

The surge diverter of the invention allows an easy optimization when adjusting the desired threshold voltage for given switching overvoltages.

What is claimed is:

1. In a surge diverter connected between a conductor terminal and ground comprising several spark-quenching gaps voltage-controlled discharge resistors connected in series with said gaps and voltage-controlled control-resistors each of which is connected in parallel either with a spark-quenching gap or with the serial unit formed by a spark-quenching gap and a discharge resistor mounted in series, the improvement wherein the voltage-controlled control-resistors have current-voltage characteristics of substantially the same steepness, and resistance values at the rated voltage which are mutually different and increase sequentially from the conductor terminal to ground.

2. Surge diverter according to claim 1, comprising control-capacitors connected in parallel with the control-resistors.

3. Surge diverter according to claim 2, wherein said control capacitors all have the same capacity.

4. Surge diverter according to claim 2, wherein said control-capacitors have mutually different capacities, which decrease from the conductor terminal to ground.

* * * * *